3,329,564
ANTACID PREPARATIONS AND MEANS OF PRODUCING THE SAME

Armando J. Aguiar, Royal Oak, and Joyce E. Zelmer, Detroit, Mich., assignors to Parke, Davis & Company, Detroit, Mich., a corporation of Michigan
No Drawing. Filed June 28, 1965, Ser. No. 467,684
13 Claims. (Cl. 167—55)

This invention relates to oral medicaments and to means for producing the same. More particularly, this invention relates to liquid antacid compositions having enzymatic activity and to the production of such compositions.

For the treatment of stomach upset, indigestion, hyperchlorhydria, peptic ulcer and similar conditions, gastric antacids are commonly employed. Gastric antacids may be clasified as systemic—those which are soluble and readily absorbed—and non-systemic—those which form compounds which are not absorbed. Gastric antacids are also classified in two catagories according to the manner in which they decrease the acidity of the gastric contents —by chemical reaction or by physical adsorption.

Sodium bicarbonate is an example of a systemic antacid. It has a prompt action in the stomach, but any excess beyond the amount required for neutralization is readily absorbed in the intestine, thereby often giving rise to systemic alkalosis. An example of a non-systemic antacid is magnesium oxide. Because of its insoluble nature, the action of magnesium oxide is less prompt, but of longer duration. With continued use, however, it tends to act as a cathartic interfering with normal bowel function.

An example of an antacid acting primarily by physical adsorption is magnesium trisilicate. The acid-combining capacity of magnesium trisilicate is low and its neutralizing effect is slow; the compound owes its usefulness to its excellent adsorptive properties.

An example of an antacid acting by physical adsorption and chemical reaction is aluminum hydroxide. The clinical activity of aluminum hydroxide has been attributed to its acid-combining power, its demulcent and protective qualities, its adsorbent action, and its amphoteric nature. Aluminum hydroxide exerts its antacid action by a chemical reaction with the hydrochloric acid of the stomach to form soluble aluminum chloride. The aluminum chloride reacts with the alkaline secretions of the intestinal tract to form basic aluminum salts which are not absorbed. Thus, aluminum hydroxide is a non-systemic antacid and does not affect the acid-base balance of the body. Although aluminum hydroxide is less reactive than magnesium trisilicate, its adsorptive properties in vivo have been reported. It has been reported further that aluminum hydroxide does not influence gastric secretion or motility, but may inactivate pepsin from the gastric juice.

There are numerous other antacid substances useful for the relief of indigestion, but the specific examples just mentioned well illustrate the kind of problems encountered.

Where the cause of indigestion is associated with an enzyme deficiency, digestive enzymes are commonly prescribed for replacement therapy. For this purpose, the enzymes are ordinarily used in dry form, being unstable in conventional aqueous, liquid preparations. The digestive enzymes are supplied as powders or in tablet or capsule form and when employed for joint therapy with an antacid, are usually taken in a dosage form physically separate from the antacid, even though the practice of having to use more than one dosage form may be inconvenient.

For the treatment of conditions such as gastric hyperacidity and peptic ulcer, it is commonly accepted that a liquid antacid preparation is the preferred dosage form. Thus, in a liquid preparation the antacid is well dispersed and neutralizes the acid immediately as it reaches the stomach. In contrast, a dry preparation such as a tablet must first disintegrate and be dispersed before it can act where required. Also, it is recognized that relief of the pain often associated with the condition is provided by the coating action on the lining of the stomach and upper intestine, an action which a liquid dosage form can accomplish more efficiently than a solid one.

Despite the need for a single liquid preparation having both enzymatic action and antacid properties, such a preparation has heretofore, so far as we are aware, not been available.

It is therefore an object of this invention to provide a stable liquid antacid preparation having enzymatic action.

Another object of the invention is to provide an antacid-enzyme preparation in which the ingredients are physically, chemically and therapeutically compatible.

A further object is to provide an antacid-enzyme preparation for oral ingestion which has a long shelf-life and which on ingestion makes available the active ingredients in useful form in the intended quantities.

These and other objects, purposes and advantages will be seen from the description which follows.

In accordance with the invention, antacid preparations suitable for oral administration containing digestive enzyme and being sufficiently stable to permit the distribution and sale of the preparations as articles of commerce, are produced by forming a colloidal, aqueous, pharmaceutically ingestible suspension of aluminum hydroxide, and adsorbing one or more digestive enzymes thereon.

The amount of aluminum hydroxide to be used varies depending on factors such as the identity and amount of enzyme to be adsorbed, but in general should be not less than the quantity required to provide complete adsorption of the enzyme. Generally, useful concentrations of aluminum hydroxide in the suspension, weight per volume calculated as $Al_2O_3$, are in the range from about 1 to 8% and preferably, 3.5 to 4.5%. Suspensions having aluminum hydroxide concentration higher than 8% can be used but without appreciable correlative benefit. As regards the physical form of the suspension and the constituency of active ingredients, the suspension should be sufficiently concentrated to permit adequate dosage in reasonable volume and yet should be sufficiently fluid to permit dispensing.

Regarding the enzyme content, the invention contemplates the use of different types of digestive enzyme, i.e., an amylolytic enzyme, a proteolytic enzyme, and a cellulytic enzyme. Thus, the preparations may contain one or more of these three types of enzyme. Preparations containing the two types of enzyme, amylolytic and cellulytic, are preferred. Where more than one enzyme is employed for any particular preparation, each enzyme is adsorbed separately and the resulting separate adsorbates combined. In a typical procedure, the enzyme is dissolved in water and, preferably after sterilization by passage through a bacterial filter, the solution is contacted with, and the enzyme adsorbed onto, the colloidal suspension of the aluminum hydroxide by mixing, usually for several hours. It is preferred that the enzymes be relatively pure (i.e., of pharmaceutical grade) but preparations of less pure enzymes may be used if desired. Commercially available grades are satisfactory. Enzyme products containing trace quantities of enzymes other than the three types mentioned above can be used. The amount of enzyme in the preparations of the invention can be varied considerably but ordinarily should be within the following approximate ranges expressed as weight equivalent of relatively pure enzyme per unit volume of suspension: 0.02 to 1.1%, and preferably 0.08 to 0.7%, for amylolytic enzyme as well as for proteolytic enzyme and 0.005 to 0.3%, and preferably 0.02 to 0.2%, for cellulytic enzyme.

To enhance the acid-managing capacity of the preparations of the invention, and without adversely affecting the enzyme content thereof, we optionally include one or more of the following antacids or colloidal adsorbents in the otherwise conventional form and concentration suited for antacid effect: aluminum phosphate, magnesium and aluminum silicates, dihydroxy aluminum aminoacetate, aluminum proteinate, bismuth aluminate, aluminum dihydroxy sodium carbonate, sodium polyhydroxy aluminum monocarbonate hexitol complexes, basic aluminum carbonate, magnesium carbonate, bismuth subgallate, bismuth subcarbonate, calcium carbonate, calcium phosphate tribasic, calcium caseinate, magnesium phosphate tribasic, gastric mucin, kaolin, bentonite, montmorillonite, attapulgite clays, and physical mixtures of aluminum hydroxide-glycine and aluminum hydroxide, sorbitol. Substances of these types provide a desired independent antacid action and yet surprisingly are compatible with, and do not interfere with, the enzyme content of the preparations of the invention.

The preparations of the invention also may include as optional ingredients any of the excipient formulation materials known in pharmacy as being suitable for liquid antacids. More specifically, the preparations may include antibacterial preservative agents (such as the lower alkyl p-hydroxybenzoates, sodium benzoate, sodium propionate, potassium sorbate and the like), sweeteners such as sodium saccharin, demulcents such as glycerin, flavoring agents, anti-caking agents, humectants, and the like.

The present invention significantly provides the enzymes on an antacid carrier from which they may be quantitatively recovered in their active form. Moreover, according to the invention, the presence of the adsorbed enzymes in no way reduces the effectiveness of the carrier as an antacid. It is further significant that the enzymes are stable over long periods of storage and are thereafter still available or readily released in their active form, in the desired amounts.

A typical long-term comparison of enzyme activity for an aluminum hydroxide-enzyme colloid preparation of the invention versus a simple aqueous solution of enzymes is seen from the following assay figures obtained using samples of the products stored at room temperature:

ALUMINUM HYDROXIDE-ENZYME SUSPENSION (40 mg. $Al_2O_3$/cc.)

| | Assay, mg./cc. |
|---|---|
| Amylase: | |
| Initial | 1.18 |
| 1½ months | 0.92 |
| 3 months | 0.97 |
| 4 months | 0.94 |
| 5 months | 0.95 |
| Prolase: | |
| Initial | 1.20 |
| 1½ months | 0.76 |
| 3 months | 0.78 |
| 4½ months | 0.67 |
| Cellulase: | |
| Initial | 0.30 |
| 1½ months | 0.24 |
| 3 months | 0.27 |
| 4 months | 0.26 |
| Aqueous Solution of 3 Enzymes: | |
| Amylase: | |
| Initial | 1.22 |
| 7 days | 0.72 |
| Prolase: | |
| Initial | 0.79 |
| 3 days | 0.38 |
| Cellulase: | |
| Initial | 0.28 |
| 1 day | 0.10 |

These results show that the three enzymes in conventional form are unstable when combined in an aqueous solution and characteristically lose substantially all activity in short periods. The results also show that the enzyme preparation of the invention not only is stable over long periods with only moderate to slight loss of enzyme activity but also represents a compatible form of enzymes of mixed types in a single aqueous preparation.

Just as the instant antacid-enzyme preparations reliably retain their desired properties over long periods of storage so also do they have their intended actions when exposed to an environment simulating first the acid conditions (pH 1.0) of the stomach and then the alkaline conditions (pH 7.5) of the intestine, i.e., as encountered in the digestive tract. Thus, it has been shown in trials simulating the in vivo condition that the hydrochloric acid of the stomach reacts chemically with the aluminum hydroxide and that this is accompanied by both a corresponding release of substantially all (i.e., more than about 80%) of the enzyme and an increase of pH to a level where the enzymes become active (i.e., approximately pH 4). It has also been shown that the presence of pepsin in gastric juice, normally a problem, has little effect on activity of the other enzymes present. Afterward, in due course, when in the presence of intestinal fluid at pH 7.5, the enzymes are still available for digestive action on the substrate, as demonstrable by assay.

We have separately determined that, in general, the optimum potency of enzymes of the types in question is in the range of pH 4 to 8. It is therefore seen that the instant antacid-enzyme preparations are well suited for optimum utilization of enzyme potency in a dynamic environment requiring and involving radically different conditions of hydrogen ion concentration.

While the requirements of a therapeutic formula are that it should be efficacious for the purposes intended, it should remain palatable and physically unchanged over a long period of storage. In this regard, conventional colloidal suspensions of aluminum and magnesium salts and the mentioned clays often set up into unpourable or difficultly pourable gels, whereas the instant preparations (including those containing aluminum and magnesium salts and the clays) are indefinitely fluid, retaining their original viscosity and pourability over long periods of storage. Moreover, the acid-consuming power remains stable over a long period in contrast to many conventional antacid preparations in liquid and tablet form which because of physical or rheological changes tend to lose their adsorptive and neutralizing powers after prolonged storage. Furthermore, whereas conventional liquid antacid preparations often give rise to an objectionable heavy coating of the mouth and tongue, the instant preparations are palatable and may be taken with little perception of after-coating of the oral surfaces.

It has been found that due to the long shelf-life of the instant antacid-enzyme preparations, precautions should be taken to package the same with materials such as glass, inert plastic, etc., compatible with the enzymes. On the other hand, such factors as pH are ordinarily not a problem since as constituted the preparations of the invention ordinarily are in the range from slightly acid to slightly alkaline, i.e., about pH 6 to 7.5.

The invention is illustrated by the following examples.

EXAMPLE 1

*Formula for antacid suspension with 3 enzymes*

| Item: | Amount |
|---|---|
| α-Amylase (Mylase 100, Wallerstein Company) g | 1.2 |
| Protease (Prolase 300-Z, Wallerstein Company) g | 1.2 |
| Cellulase (Cellase 1000, Wallerstein Company) g | 0.3 |
| Aluminum hydroxide gel (9.9% $Al_2O_3$) g | 404.0 |
| Methyl p-hydroxybenzoate, U.S.P. g | 2.0 |
| Propyl p-hydroxybenzoate, U.S.P. g | 0.5 |
| Glycerin, U.S.P. cc | 10.0 |
| Sorbitol Solution, U.S.P. cc | 80.0 |

| Item: | Amount |
|---|---|
| Sodium saccharin, U.S.P _____g__ | 0.1 |
| Aminoacetic acid, N.F. _____g__ | 13.4 |
| Flavor, oil peppermint, U.S.P. _____cc__ | 0.13 |
| Alcohol, U.S.P. _____cc__ | 1.3 |
| Distilled Water, q.s. ad _____cc__ | 1000.0 |

PROCEDURE (1) Dissolve the amylase, protease and cellulase separately, each in 50 cc. of water and sterilize each solution by filtration through an unglazed porcelain (Selas 03) candle.

(2) Divide the aluminum hydroxide gel into three portions. To each of the portions add one of the enzymes in solution. Slurry and thoroughly mix separately for 3 hours to insure complete adsorption of each enzyme on the aluminum hydroxide. Combine the three suspensions and homogenize.

(3) Add the remaining ingredients (the flavor having been made up in alcoholic solution) to the homogenized suspension, mix well, make up to volume, and homogenize.

The resulting liquid antacid-enzyme preparation provides for each 5-cc. teaspoon dose about 6 mg. each of amylase and protease, about 1.5 mg. of celulase and about 200 mg. of aluminum hydroxide (calculated as $Al_2O_3$). Other preparations, either more concentrated or less concentrated with respect to the enzymes and the aluminum hydroxide, can be made by the same procedure using otherwise the same formulation. For example, one may make suitable preparations containing the following amounts per teaspoon dose.

|  | Dilute Formula, mg. | Concentrated Formula, mg. |
|---|---|---|
| Amylase | 1 | 30 |
| Protease | 1 | 30 |
| Cellulase | 0.25 | 10 |
| Aluminum hydroxide gel (as $Al_2O_3$) | 50 | 400 |

The same formulation can also be suitably made up with different concentrations of sorbitol or without sorbitol. Likewise, without sacrifice of the benefits of the invention, one may make simplified preparations according to the formulation but omitting the glycerin, aminoacetic acid, sweetener, flavor and/or alcohol.

As indicated, the enzyme content per dose of the suspension described is about 6 mg. for amylase and protease and 1.5 g. for cellulase. It is found that when such a preparation is stored for long periods, it may undergo a loss in enzyme content, but that the loss is only slight to moderate. Even with the loss, the enzyme content ordinarily remains at a high level which persists for long periods. As will be appreciated, minor losses of this kind can be predetermined and can be offset simply by incorporating an excess of enzyme over the nominal or label value, according to conventional practice, so that the formulation remains above label claim for long periods of storage.

The following results are a typical illustration of the retention of enzyme for the suspension exemplified above:

| Storage Time at Room Temperature, Months | Enzyme Content Per Dose, mg. | | |
|---|---|---|---|
|  | α-Amylase | Cellulase | Protease |
| 0 | 5.9 | 1.5 | 6 |
| 1.5 | 4.6 | 1.2 | 3.8 |
| 3 | 4.7 | 1.4 | 3.9 |
| 4.5 |  |  | 3.4 |
| 5 | 4.7 |  |  |
| 8 |  | 1.3 |  |
| 11 | 4.0 | 1.4 |  |
| 13 | 3.7 | 1.3 |  |
| 19 | 3.6 | 1.3 |  |

Similar results are obtained for a formulation exactly the same except for a higher initial enzyme content:

| Storage Time at Room Temperature, Months | Enzyme Content Per Dose, mg. | | |
|---|---|---|---|
|  | α-Amylase | Cellulase | Protease |
| 0 | 21.6 | 15.0 | 21.0 |
| 1.5 | 17.4 |  | 17.4 |
| 3 | 18.4 | 15.0 | 17.1 |
| 4.5 |  |  | 14.9 |
| 5 | 18.0 |  |  |
| 6 |  | 12.0 |  |
| 11 | 15.4 | 12.3 |  |
| 13 | 16.5 | 10.1 |  |
| 19 | 15.4 | 10.5 |  |

EXAMPLE 2

*Formula for antacid suspension containing two enzymes*

| Item: | Amount |
|---|---|
| Aluminum hydroxide gel (9.7% $Al_2O_3$) __g__ | 412.4 |
| Sorbitol (as solution), U.S.P. _____cc__ | 100 |
| Glycerin, U.S.P. _____cc__ | 10 |
| Butyl p-hydroxybenzoate, U.S.P. _____g__ | 0.2 |
| Propyl p-hydroxybenzoate, U.S.P. _____g__ | 0.3 |
| Cellulase (Cellase 1000) _____g__ | 0.4 |
| α-Amylase (Mylase 100) _____g__ | 1.4 |
| Glucose Liquid, U.S.P. _____g__ | 300 |
| Alcohol, U.S.P. _____cc__ | 2.5 |
| Flavor, q.s. |  |
| Water, distilled, q.s. _____liter__ | 1 |

PROCEDURE (1) Dissolve each enzyme in water (100 cc.) and filter through porcelain (Selas 03). Add the resulting two filtered enzyme solutions to separate half-portions of the aluminum hydroxide gel and process to complete adsorption as in Example 1, Step 2.

(2) Mix the resulting homogenate and the sorbitol solution, glycerin and benzoate esters.

(3) Add the glucose and the flavor (in alcohol). Mix thoroughly.

(4) Homogenize the suspension.

Each teaspoon of the resulting antacid-enzyme preparation provides about 2 mg. of cellulase, 7 mg. of amylase and 200 mg. of aluminum hydroxide (as $Al_2O_3$). The enzyme stability of such a preparation is satisfactorily maintained for long periods.

EXAMPLE 3

*Formula for combination antacid-enzyme suspension*

| Item: | Amount |
|---|---|
| Aluminum hydroxide gel (9.9% $Al_2O_3$) __g__ | 404.0 |
| Sorbitol (as solution), U.S.P. _____cc__ | 100 |
| Sodium benzoate _____g__ | 5 |
| Cellulase (Cellase 1000) _____g__ | 6 |
| Montmorillonite clay (Veegum, R. T. Vanderbilt Co.) _____g__ | 2.0 |
| Flavor, raspberry, water-soluble, q.s. |  |
| Distilled water, q.s. _____liter__ | 1 |

PROCEDURE (1) Mix the aluminum hydroxide gel, sorbitol and sodium benzoate.

(2) Dissolve the cellulase in water (200 cc.) and filter the solution through a bacterial filter. Add the filtrate to the mixture of Step 1 and mix for one hour.

(3) Stir the clay in water (100 cc.) at 38 to 50° C. for about an hour until it is hydrated and add to the mixture of Step 2 with thorough mixing.

(4) Add the flavor, bring to volume and homogenize.

The resulting preparation, which contains per teaspoon about 30 mg. of cellulase, 200 mg. of aluminum hydroxide ($Al_2O_3$), and 10 mg. of montmorillonite clay, is intended for use in conditions of the kind where cellulytic function is impaired or substantially lacking. The same formulation and procedure can be used with either a proteolytic enzyme or amylolytic enzyme (e.g., about 3 g.) substituted in place of the cellulase. The pharmaceutical elegance of the formulation is enhanced by the addition of the montmorillonite clay. The clay does not interfere with enzyme activity or measurement of the enzyme content of the formulation. If desired, the other previously mentioned adsorptive clay materials of pharmaceutical grade can be substituted in the formulation in place of the Veegum: i.e., kaolin, bentonite or attapulgite.

Other auxiliary antacids can be used together with aluminum hydroxide in the formulation (with or without the montmorillonite clay) among which other antacids the following may be mentioned for purposes of illustration, the amount in grams recommended for use being listed in parentheses for each: magnesium carbonate (60–120), magnesium trisilicate (100–200), magnesium phosphate tribasic (60–120), calcium carbonate (120), calcium phosphate tribasic (120), basic aluminum carbonate (40), aluminum phosphate (80), and dihydroxy aluminum amino acetate (200).

While in the foregoing description we have set forth embodiments of the invention in detail, it will be realized by those skilled in the art that considerable variation can be made in such detail without departing from the spirit of our invention.

We claim:

1. A stable aqueous antacid composition comprising a colloidal aqueous ingestible suspension of aluminum hydroxide in a concentration of about 1 to 8% weight per volume calculated as $Al_2O_3$, and an effective amount of at least one digestive enzyme adsorbed on the aluminum hydroxide, the adsorbed enzyme being selected from the group consisting of amylase, protease and cellulase.

2. A composition according to claim 1 where the digestive enzyme is amylase.

3. A composition according to claim 1 where the digestive enzyme is protease.

4. A composition according to claim 1 where the digestive enzyme is cellulase.

5. A composition according to claim 1 containing amylase and cellulase.

6. A composition according to claim 1 containing amylase, protease and cellulase.

7. A stable aqueous oral medicament comprising an effective amount of at least one digestive enzyme, the enzyme being adsorbed on aluminum hydroxide and being selected from the group consisting of amylase, protease and cellulase, the aluminum hydroxide being present as a colloidal aqueous ingestible suspension in a concentration sufficiently fluid to permit dispensing and not less than required to provide complete adsorption of the enzyme.

8. A medicament according to claim 7 containing amylase.

9. A medicament according to claim 8 where the amylase is present in the approximate range of 0.02 to 1.1% expressed as weight per unit volume of suspension.

10. A medicament according to claim 7 containing cellulase.

11. A medicament according to claim 10 where the cellulase is present in the approximate range of 0.005 to 0.3% expressed as weight per unit volume of suspension.

12. A medicament according to claim 7 where the aluminum hydroxide is present sufficient for dosage purposes to provide an antacid effect.

13. A medicament according to claim 7 containing an effective amount of an antacid compatible with the enzyme in addition to aluminum hydroxide.

References Cited

Chemical Abstracts 51: 9738 (1957).
Chemical Abstracts 60: 11853 (1964).

ALBERT T. MEYERS, *Primary Examiner.*

SAM ROSEN, *Examiner.*

S. SINGER, *Assistant Examiner.*